(12) United States Patent
Currens et al.

(10) Patent No.: US 6,440,334 B2
(45) Date of Patent: *Aug. 27, 2002

(54) METHOD OF MAKING A RETROREFLECTIVE ARTICLE

(75) Inventors: Michael D. Currens, Eagan, MN (US); Vera Lightle, Hudson, WI (US)

(73) Assignee: 3M Innovative Properties Company, St. Paul, MN (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/330,694

(22) Filed: Jun. 11, 1999

(51) Int. Cl.[7] .............................................. B29D 11/00
(52) U.S. Cl. ....................... 264/1.34; 264/1.9; 156/232; 156/235; 156/239
(58) Field of Search ................................. 156/232, 233, 156/235, 237, 238, 239, 241; 359/530; 264/1.9, 1.31, 1.34

(56) References Cited

U.S. PATENT DOCUMENTS

| | | | |
|---|---|---|---|
| 2,464,738 A | * | 3/1949 | White et al. ................ 264/1.34 |
| 3,712,706 A | | 1/1973 | Stamm |
| 4,127,706 A | | 11/1978 | Martin et al. |
| 4,588,258 A | | 5/1986 | Hoopman |
| 4,605,461 A | | 8/1986 | Ogi ............................ 156/233 |

(List continued on next page.)

OTHER PUBLICATIONS

Cueff, R. et al.; "Study of thin alumina coatings sputtered on polyethylene terephthalate films"; Thin Solid Films 266 (1995) pp. 198–204.

(List continued on next page.)

Primary Examiner—Michael W. Ball
Assistant Examiner—Barbara J. Musser
(74) Attorney, Agent, or Firm—Yen Tong-Florczak; Rudolph P. Hofmann, Jr.

(57) ABSTRACT

A process for making a retroreflective article that includes the steps of providing a device (tool or a mold) having a first structured surface; applying a reflective layer on the first structured surface resulting in a first adhesion value between the reflective layer and the first structured surface, the reflective layer having an exposed surface; applying a molding polymer to the exposed surface of the reflective layer resulting in a second adhesion value between the reflective layer and the molding polymer. The second adhesion value is higher than the first adhesion value. The device is separated from the molding polymer to yield a retroreflective article that has a second structured surface that is the reverse image of the first structured surface. The separation causes a transfer of the reflective layer from the first structured surface to the retroreflective article. The method allows the reflective layer to be formed during the separation step, rather than being formed independent of creating the second structured surface. The method can yield a article that has a second structured surface coated with an aluminum reflective material having aluminum microstructures that are predominantly amorphous on a first side (the side near the second structured surface) and predominantly crystalline on a second side, which is opposite the first side.

19 Claims, 3 Drawing Sheets

U.S. PATENT DOCUMENTS

| | | | |
|---|---|---|---|
| 4,645,714 A | 2/1987 | Roche et al. | |
| 4,763,985 A | 8/1988 | Bingham | |
| 4,895,428 A | 1/1990 | Nelson et al. | |
| 5,141,989 A | 8/1992 | Jung et al. | |
| 5,257,491 A | 11/1993 | Rouyer et al. | |
| 5,376,431 A | 12/1994 | Rowland | 428/164 |
| 5,450,235 A | 9/1995 | Smith et al. | |
| 5,512,219 A | 4/1996 | Rowland et al. | 264/1.6 |
| 5,539,033 A | 7/1996 | Bredahl et al. | |
| 5,550,175 A | 8/1996 | Bredahl et al. | |
| 5,642,222 A | 6/1997 | Phillips | 359/530 |
| 5,691,846 A | 11/1997 | Benson, Jr. et al. | |
| 5,770,124 A | 6/1998 | Marecki et al. | |
| 5,780,140 A * | 7/1998 | Nilsen | 156/242 |
| 5,814,355 A * | 9/1998 | Shustal et al. | 425/373 |
| 5,831,766 A | 11/1998 | Martin et al. | 359/529 |

OTHER PUBLICATIONS

Gregory M. Porta, et al., Vacuum Metallization of Polyetherimide: Interfacial Chemistry and Adhesion, vol. 32, No. 15, Polymer Engineering and Science (Mid–Aug. 1992), p. 1021–1027.

C.H. Bicher, et al., Adhesion mechanism of aluminum, aluminum oxide, and silicon oxide on biaxially oriented polypropylene (BOPP), poly(ethyleneterephthalate) (PET), and poly(vinyl chloride) (PVC), vol. 11, No. 2, Journal of Adhesion Science & Technology (1997), p. 233–246.

M. E. Kordesch and R. W. Hoffman, Strongly Adhesive Gold Electrodes on Melinex®, vol. 107, Thin Solid Films, (1983), p. 365–371.

*Thin Films*, vol. 23, Kirk–Othmer Encyclopedia of Chemical Technology, $4^{th}$ Ed. (1997), pp. 1040–1055, and 1066–1067.

H. Yasuda, *Plasma Polymerization*, Academic Press, New York (1985).

Henkel's Jan. 1997 Data Sheet entitled "Formulation Guide E—Ultraviolet Metal Coatings and Inks."

ASTM E 28–97.

* cited by examiner

METHOD OF MAKING A RETROREFLECTIVE ARTICLE

The present invention pertains to a method of making a retroreflective article, which includes the steps of applying a molding polymer to a reflective coated microstructured tool and causing a transfer of the reflective layer from the tool to the article. The invention also pertains to retroreflective articles that have a structured surface and an aluminum reflective layer disposed on that surface, where the reflective layer adjacent to the structured surface has atoms arranged in a predominantly amorphous arrangement.

BACKGROUND

Retroreflective articles have the ability to return substantial quantities of incident light, which otherwise would be reflected elsewhere, back towards the light source. This unique ability has led to widespread use of retroreflective articles in a variety of applications relating to traffic and personal safety. For example, in the personal safety area, retroreflective articles have been used on clothing, primarily to enhance a pedestrian's visibility to motor vehicle operators after dusk or under other low visibility conditions. They also have been attached to book-bags and backpacks for the same purpose. Retroreflective articles can be made from cube-corner structures, such as cube-corner elements and cube-corner shaped cavities.

Cube-corner elements are structures that resemble the corner of a room—that is, they contain three generally perpendicular faces that meet at a point or an apex. Cube-corner cavities, on the other hand, are structures that are defined by a recessed area bounded by three generally perpendicular faces that meet at a point in a valley. In general, the cube-corner formation process, whether forming cube-corner elements or cube-corner shaped cavities, is referred to as "replication." Numerous methods exist for making cube-corner retroreflective articles. For example, U.S. Pat. No. 5,450,235 to Smith et al. discloses an extrusion method, where a stream of polymer melt is extruded into a microstructured mold containing a multitude of cube-corner shaped cavities. The resulting product is a microstructured article that has a plurality of cube-corner elements arranged in an array. U.S. Pat. No. 5,691,846 to Benson, Jr. et al. discloses another method, where a curable resin solution is applied to a mold having a multitude of cube-corner shaped cavities. An overlay film is allowed to contact the resin. The resin solution is cured using actinic radiation to form a composite sheeting that has an array of cube-corner elements bonded to the overlay film.

Cube-corner shaped cavities have been made by various methods. Such methods, however, typically have separated the process of making a retroreflective article from the process of process of metalizing the article—that is, the process of applying a reflective layer onto the article.

For example, U.S. Pat. No. 3,712,706 to Stamm discloses a reflective surface having an array of cube-corner shaped cavities. Stamm discloses a method where a cube-corner structure is made by inscribing three parallel equidistant intersecting grooves on a flat surface of a metal plate. This inscribing process forms a continuous pattern of sharp pointed, solid triagonal pyramids with 90° internal dihedral angles. A dihedral angle is the angle formed by two intersecting planes. Stamm explains that the pyramid pattern is a negative form of the desired cube-corner shaped cavity pattern. The negative form (i.e., the pyramid pattern) may be used as a die for impressing the desired array of cube-corner cavities in a flat plastic surface or in metal foil. The cavity array can be mirror coated on all faces with, for example, evaporated gold, aluminum, or chromium. The cube-corner cavities are filled with an optically transparent solid medium to complete the making of the retroreflector.

U.S. Pat. No. 4,127,693 to Lemelson discloses another method of making cube-corner shaped cavities. In one embodiment, a reflector device comprises a base member that is capable of being molded or embossed with a plurality of cavities, each cavity being shaped to define a cube-corner reflector. The cavities have walls that are composed of three or more triangular flat surfaces. In a separate step, a thin film of metal may be deposited against the cavity surfaces. A protective transparent sheet can be placed over the cavities.

SUMMARY

The present invention provides a new method of making a retroreflective article, which method can allow the article to be formed and made reflective contemporaneously. In brief summary, the inventive method comprises: (a) providing a device that has a first structured surface; (b) applying a reflective layer on the first structured surface such that a first adhesion value is established between the reflective layer and the first structured surface, the reflective layer having an exposed surface; (c) applying a molding polymer to the exposed surface of the reflective layer such that a second adhesion value is established between the reflective layer and the molding polymer, the second adhesion value being higher than the first adhesion value; and (d) separating the device from the molding polymer to yield the retroreflective article having a second structured surface, the separation causing a transfer of the reflective layer from the first structured surface to the retroreflective article. The device can be a tool or a mold. The inventive method differs from known methods in that it can combine the process of forming the second structured surface and applying a reflective layer in essentially a single step. When the reflective layer used in the method includes aluminum, applicants discovered that a new article was produced that had aluminum microstructures that are predominantly amorphous on a first side (the side near or next to the second structured surface) and predominantly crystalline on a second side (the side furthest away from the second structured surface).

An advantage of the method of the present invention is that it can eliminate the need to form the reflective layer directly on the inventive article. Because of the high temperature and high vacuum processing conditions typically present in many vapor deposition processes, residual solvents or monomers contained in a polymeric tool or mold can sometimes outgas and can cause blisters and defects in the reflective coating. When reflective layers have been deposited directly onto a polymeric tool or mold, investigators have had to take care in selecting ones that are capable of withstanding the vapor deposition process conditions. The differences between a tool and a mold are defined in detail below. The method of the present invention, however, provides the advantage in that the reflective layer is not directly vapor deposited to the second structured surface of the inventive article and therefore may not significantly impose upon the types of material that may be selected to make the inventive retroreflective article.

The new retroreflective article of the invention comprises: (a) a structured surface that is configured for allowing the article to retroreflect incident light; and (b) an aluminum reflective layer disposed on the structured surface, the aluminum layer having first and second sides, the first side disposed towards the structured surface and lies opposite the second surface, wherein the first side has an aluminum microstructure in a predominantly amorphous arrangement.

Retroreflective articles of the invention, which possess an aluminum-containing reflector, differ from known retroreflective articles in regard to the arrangement of the aluminum atoms. Unlike the articles described in U.S. Pat. Nos. 3,712,706 and 4,127,693, the present inventive article includes an aluminum reflective layer where the aluminum atoms disposed towards the structured surface have a generally amorphous arrangement and the metal atoms away from the structured surface have a generally crystalline arrangement.

BRIEF DESCRIPTION OF THE DRAWINGS

The invention is further explained with reference to the drawings, wherein.

These figures are idealized, are not to scale, and are intended to be merely illustrative and non-limiting.

DEFINITIONS

As used in this document in reference to the invention:

a reflective layer having a "predominantly amorphous arrangement" means that the atoms, molecules, or ions in the layer lack organization, such as periodicity or repetitive arrangement;

a reflective layer having a "predominantly crystalline arrangement" means that the atoms, molecules, or ions bonded together in three-dimensions in the layer do exhibit a repetitive or periodic, orderly arrangement;

"cube-corner shaped cavity" means a recessed area bounded at least in part by at least three optical faces and may include non-optical faces;

"cube-corner element" means a body, such as a pyramid, projecting from a surface, where the body is defined at least in part by at least three optical faces and may include non-optical faces;

"faces" of a cube-corner element are planes that intersect one another;

"mold" is a device that has a plurality of cavities, such as cube-corner shaped cavities, that define a first structured surface, which can be used with a molding polymer to create an article having a second structured surface defined by a plurality of elements, such as cube-corner elements;

"molding polymer" is a natural or synthetic compound, usually of high molecular weight (greater than about 1000 gram/mole), that contains repeated linked units and that can have adhesive properties (such as tackiness) at room temperature;

"non-optical faces" in a cube-corner element or cube-corner shaped cavity are faces that are incapable of cooperating with other faces to retroreflect significant amounts of incident light because the non-optical faces are substantially non-orthogonal to other faces;

"optical faces" in a cube-corner element or cube-corner shaped cavity are faces that are substantially mutually perpendicular—that is, the faces form an internal dihedral angle of about 900, to cooperate to retroreflect incident light;

"softening temperature" means a temperature as defined by ASTM E 28-97;

"structured surface" means a surface that has a plurality of features which is defined by local minima and maxima, the separation distance between neighboring local minima and maxima being in the range of about 0.01 millimeter to 1 millimeter (about 0.0004 to 0.040 inch) such as, for example, cube-corner elements, cube-corner shaped cavities, or combinations thereof; and "tool" is a device that has a plurality of elements, such as cube-corner elements, that define a first structured surface, which can be used with a molding polymer to create an article having a second structured surface defined by a plurality of cavities, such as cube-corner cavities.

DETAILED DESCRIPTION OF THE ILLUSTRATIVE EMBODIMENTS

Figure 1:
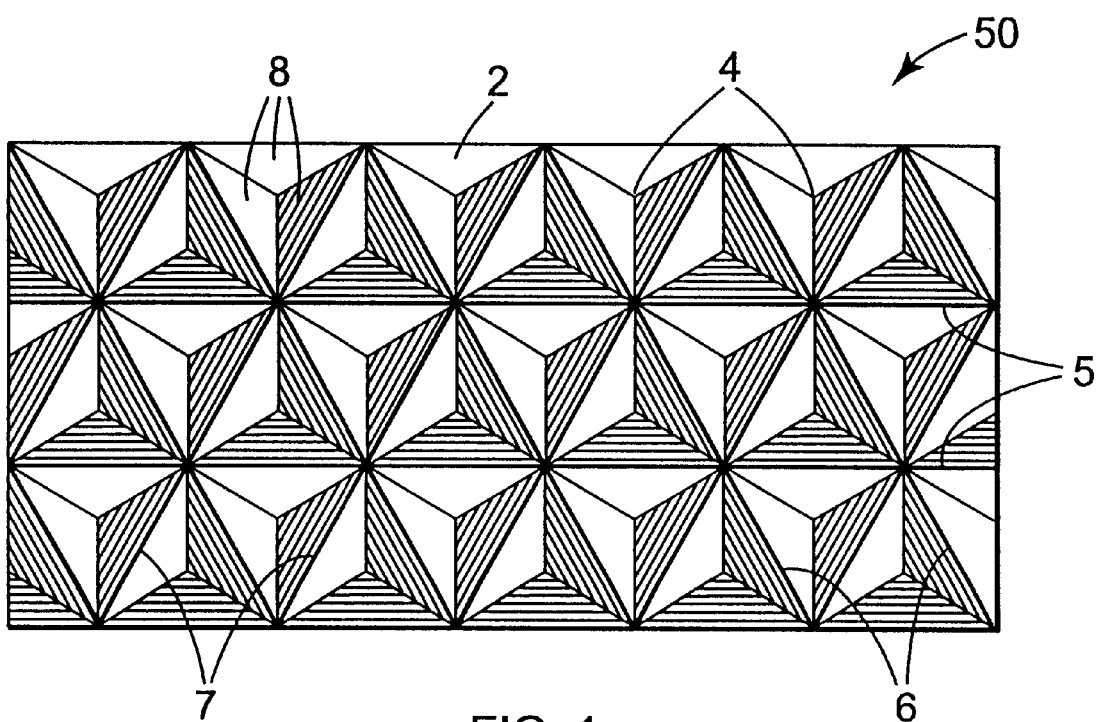
FIG. 1 is a top view of a known array 50 of cube-corner elements 2.

FIG. 1 shows a topview of a known array 50 that contains cube-corner elements 2 projecting from a surface. Each element 2 is in the shape of a tetrahedral prism that has three exposed optical faces 8 and an apex 4. The optical faces of the cube-corner elements define a first structured surface. Cube-corner elements 2 in known arrays are typically defined by three sets of parallel v-shaped grooves 5, 6, and 7. Adjacent optical faces 8 on adjacent cube-corner elements 2 in each groove form an external dihedral angle, which is the angle formed by two intersecting planes. The array 50 can be used as a cube-corner tool for making an article that bears cube-corner shaped cavities. As shown, each cube-corner element in the ordered array sits adjacent to one another. The dihedral angle can vary in some embodiments of known cube-corner arrays as disclosed in U.S. Pat. No. 5,770,124 to Marecki et al.

Figure 2:
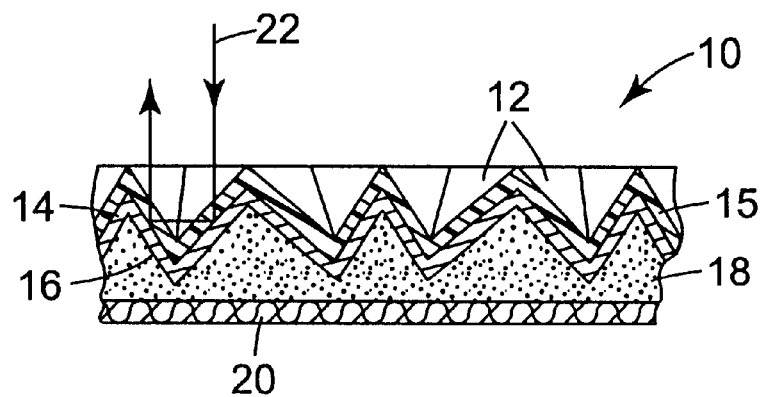
FIG. 2 is a cross-sectional view of a retroreflective article 10 in accordance with the invention.

FIG. 2 shows an illustrative embodiment of the inventive article 10 having a molding polymer 18 and a structured surface 16 defining, in this case, a plurality of cube-corner shaped cavities 12. Disposed on the structured surface 16 is a reflective layer 14. If desired, a light transmissible protective layer 15 can be used to protect the reflective layer 14. As shown, the layer 15 follows the topography of the structured surface 16. The protective layer 15 can fill a portion of the cavity or fill the entire cavity 12. Other layers may be disposed between the molding polymer 18 and the reflective layer 14 such as tie layers. An optional carrier web 20 serves as a support member for the molding polymer 18. Suitable examples of carrier webs include fabrics and polymer films. In use, retroreflection occurs when an incident light ray 22 enters the cavities, strikes the reflective layer 14 on the structured surface 16, and is returned towards the light source.

The structured surface is configured to retroreflect incident light. The structured surface can be found on the tool (30 in FIGS. 4 and 5) and on the inventive article (10 in FIG. 2). When used to describe the tool or the mold, the term "first structured surface" is usually used. When used to describe the inventive article, the term "second structured surface" is usually used.

In one inventive embodiment, the structured surface is defined by a plurality of cube-corner shaped cavities, which are formed from a plurality of cube-corner elements present on the tool. A mold, on the other hand, is made of a plurality of cube-corner cavities, in which case, the resulting inventive article contains a plurality of cube-corner elements. Illustrative examples of structured surfaces, on either a tool or a mold, that are useful for the practice of the invention are discussed below.

U.S. Pat. No. 3,712,706 to Stamm discloses a useful cube-corner element based on a hexagonal close-packed array of contiguous cube-corner elements, each element having an equilateral base triangle defined by three base edges lying in a common plane and three optical faces intersecting at a point. Each element has an optical axis that extends through the apex and trisects the element's internal space. The optical axis is perpendicular to the base triangle.

U.S. Pat. No. 4,588,258 to Hoopman provides another useful cube-corner element based on an equilateral base triangle with a modification in that the optical axis is tilted towards one of the base triangle's base edge. In use, at least one matched pair of cube-corner elements produces retroreflection. A matched pair of elements occurs when the elements are rotated 180° with respect to one another.

Another useful cube-corner design is disclosed in U.S. Pat. No. 4,895,428 to Nelson et al. The cube-corner element has a rectangular base, two tetragonal faces nearly perpendicular to each other and having a line of intersection. The element contains a triangular face that intersects nearly perpendicular to the tetragonal faces forming an approximate cube-corner. The element further contains another triangular face intersecting not perpendicular to the tetragonal faces forming a non-orthogonal face. The non-orthogonal triangular face is not active optically. Thus, the cube-corner element has two parallel grooves and appears as a pup-tent type pyramid.

The foregoing discussion on specific cube-corner element designs merely illustrates some, but not all, of the types of cube-corner elements, which are suitable for practicing the present invention. The reverse image of the cube-corner elements would be the cube-corner shaped cavities. Other designs also capable of retroreflecting some significant portion of the incident light are contemplated for use in connection with the present invention.

The inventive article has a second structured surface that can be formed when a molding polymer is processed so as to take on the shape of (that is, replicate) the first structured surface of the tool, which has been previously coated with a reflective layer. The molding polymer enables the reflective layer coated on the tool to adhere preferentially to the second structured surface. That is, the adhesion between the molding polymer and the reflective layer is higher than the adhesion between the first structured surface and the reflective layer. The first structured surface can be made from a wide variety of materials, ranging from metals to polymers. Articles that discuss the adhesion of reflective metals, which may be suitable for use in reflective layers, for example, aluminum, silver, tin, or gold, on various polymeric substrates are available in the art.

For example, adhesion, in terms of peel strength, of an aluminum layer of about 1000 nanometers thick deposited on a polyetherimide substrate has been studied. See, Gregory M. Porta, et al., Vacuum Metallization of Polyetherimide: Interfacial Chemistry and Adhesion, Volume 32, No. 15, Polymer Engineering and Science (Mid-August 1992), page 1021–27. The article further describes methods that can increase the adhesion of aluminum to the substrate, such as, for example, by surface cleansing before deposition.

The adhesion of aluminum on various polymer substrates, such as biaxially oriented polypropylene (BOPP), both untreated and treated with low pressure $O_2$ plasma, polyethylene terephthalate (PET), and polyvinyl chloride (PVC) have also been studied. See C. H. Bicher, et al., Adhesion mechanism of aluminum, aluminum oxide, and silicon oxide on biaxially oriented polypropylene (BOPP), poly (ethyleneterephthalate) (PET), and poly(vinyl chloride) (PVC), Volume 11, No. 2, Journal of Adhesion Science & Technology (1997), page 233–246. The aluminum is evaporated in a vacuum web coater using an electron beam from a water-cooled crucible. The aluminum layer was about 60 nanometer (nm) thick.

The adhesion of gold and aluminum, among other metals, on Melinex® 505, Melinex® 442 (both of which are polyester based film), and polystryene have been studied. See M. E. Kordesch and R. W. Hoffinan, Strongly Adhesive Gold Electrodes on Melinex®, Volume 107, Thin Solid Films, (1983), page 365–371. The article reports that both types of Melinex® are commercially available from ICI Americas, Inc. The gold films are vacuum evaporated to a thickness of about 10 to 50 nm.

Preferably, the molding polymer replicates the tool's structured surface as precisely as possible so as to capture substantially its entire shape. For this to occur, the molding polymer preferably fills the valleys or recessed area on the tool's structured surface. The replication process desirably produces a second structured surface that has substantially flat faces to aid in retroreflective efficiency. The molding polymer is preferably sufficiently stable so that it will not distort, sag, or change shape over time. For retroreflective articles that are used on clothing, the second structured surface preferably maintains its shape even after repeated exposure to laundering cycles in washing machines. The thickness of the molding polymer is typically sufficient so as to replicate the tool's structured surface entirely. Preferably, there is sufficient molding polymer to join the second structured surface of the inventive article in a continuous array. The amount of molding polymer used, however, should not be so thick as to reduce the inventive article's flexibility or so as to be cost prohibitive.

The molding polymer may be a thermoplastic or thermoset polymer. Suitable examples of thermoplastic polymers include ethylene copolymers containing carboxyl groups or esters of carboxylic acids, polyethylene acrylate, polyesters, polyurethanes, polyamides, polyester amides, and crystalline rubber based polymers. The softening temperature of the thermoplastic polymer preferably is less than 450° F., and more preferably less than 350° F., as determined by ASTM E28–97 entitled "Softening Point of Resins by Ring-and-Ball Apparatus." A suitable example of a thermoset polymer is ethylene acrylic acid (EAA) that has been cross-linked using actinic radiation, such as electron beam radiation.

Another suitable molding polymer is a hot melt adhesive. The adhesive may be a thermoplastic or thermoset polymer. Generally, a hot melt adhesive uses components, including solventless polymers and additives, such as tackifying resins and plasticizers. The components are processed so as to flow or creep under stress. Typically, they are processed using extrusion. U.S. Pat. No. 5,257,491 to Rouyer discloses a method of packaging an adhesive composition, especially a thermoplastic or thermoset hot melt adhesive composition. When Rouyer's hot melt adhesive is used in the present invention, it may be extruded directly onto the first structured surface, which has been previously coated with a reflective layer. Alternatively, the hot melt adhesive can be extruded onto a carrier, such as a fabric or a polymeric film, and laminated to the first structured surface, which has been previously coated with a reflective layer. Depending on the chemistry of the hot melt adhesive, it can be cured by ultraviolet light or electron beam radiation.

U.S. Pat. Nos. 5,539,033 and 5,550,175, both to Bredahl et al., disclose solventless hot melt processes to prepare non-thermosettable pressure sensitive adhesives (PSA) usefull in the present invention. Both processes use a continuous, compounding device that has a sequence of alternating conveying and processing zones. The processes allow for processing of non-thermoplastic hydrocarbon elastomers and tackifiers, without using organic solvents or low molecular weight plasticizing agents, both of which reduce the viscosity of the composition to render it processable. U.S. Pat. No. 5,539,033 discloses a wide variety of non-thermoplastic hydrocarbon elastomers and tackifiers. Examples of the elastomers include natural rubber, butyl rubber, synthetic polyisoprene, ethylene-propylene rubber, ethylene-propylene-diene monomer rubber (EPDM), polybutadine, poly-(alpha-olefin), and styrene-butadiene random copolymer rubber. Examples of useful tackifiers include rosin and rosin derivatives, hydrocarbon tackifier resins, aromatic hydrocarbon resins, and terpene resins, all of which are used from 10 to 200 parts by weight per 100 parts by weight of the elastomer.

U.S. Pat. No. 5,141,989 to Jung et al. discloses yet another molding polymer useful in the present invention. Jung teaches a screen-printable acrylate PSA composition essentially comprising (1) a dissolved polymeric solid comprising at least one acrylate copolymer, and (2) a polar low molecular weight solvent in which the acrylate copolymer is dissolved. Jung discloses that at the screen printing stage, the acrylate copolymer has an inherent viscosity of less than 1.0 deciliter/gram, and that a particularly useful inherent viscosity is one of about 0.45 dl/g. At the lower viscosity, the PSA composition flows out quickly and smoothly to form a planar and even coating. Jung indicates that the PSA exhibits high stability against water and moisture so that it may be used for outdoor applications.

The reflective layer is typically opaque and preferably specularly reflective, although other reflective layer types can be used. The reflective layer is preferably metallic. Suitable materials for use as reflective layers include aluminum, gold, silver, tin and combinations thereof. Aluminum and silver are used commonly to provide a specular reflector. In some cases, gold is a useful specular reflector because of its inert properties, making it resistant to corrosion, and because of its color. Dielectrics may also be used as a reflective layer (see U.S. Pat. No. 4,763,985 to Bingham).

The reflective layer is typically about 100 to 1500 nanometers (nm) thick, preferably about 500 to 1200 nm thick. By using the vapor deposition processes, the reflective layer is deposited initially on the first structured surface. For a description of the different vapor deposition processes, see Thin Films, Volume 23, Kirk-Othmer Encyclopedia of Chemical Technology, 4$^{th}$ edition, (1997), pages 1040–1050. In addition, the reflective layer can be formed by spray coating. The reflective layer is desirably uniformly deposited and lies substantially flat on the first structured surface. If the reflective layer starts out uniform and flat on the first structured surface, then there is a better chance that it will remain uniform and flat after its transfer to the molding polymer.

Figure 3:
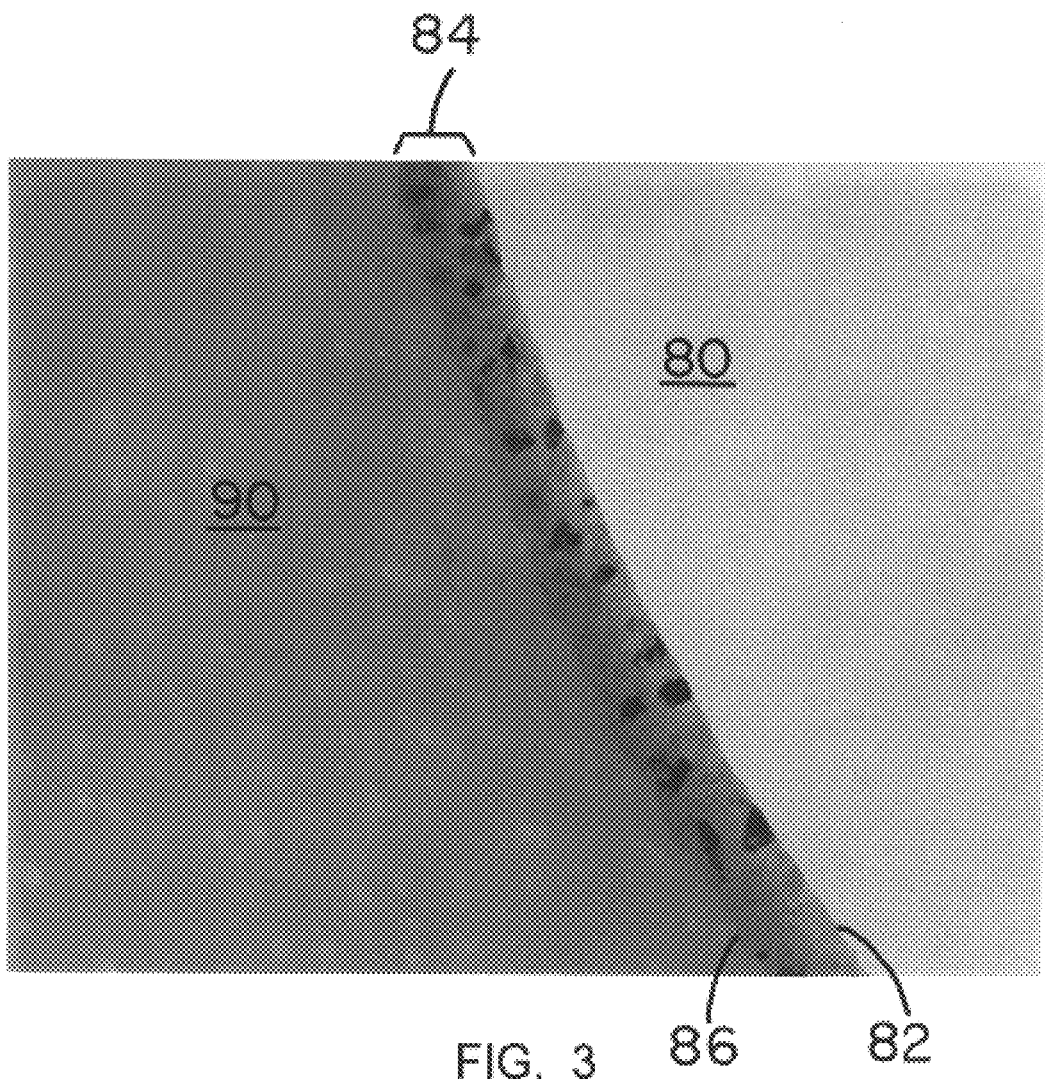
FIG. 3 is a cross-sectional micrograph (magnified about 67,950 times, such that 0.675 centimeters on the micrograph equals 100 nm in actual length) of an aluminum reflective layer 84 deposited on an acrylate substrate 80 (the micrograph was obtained from a transmission electron microscope)

FIG. 3 is a transmission electron microscope (TEM) micrograph depicting the microstructures of the aluminum reflective layer 84 deposited onto a cube-corner tool 80. The tool has a first structured surface 82 made from an acrylate polymer. For TEM analysis, the aluminum-coated tool is encased in an embedding resin 90 and is cross-sectioned. The aluminum layer is deposited onto the first structured surface as described below in the Example section.

As can be seen, the aluminum layer 84 has two types of microstructure. Near the surface 82, the aluminum atoms are in a predominantly crystalline arrangement as shown by the grain like structures, some of which appear as dark regions. As more aluminum atoms are deposited (to form the reflective layer), they change from a crystalline arrangement to an amorphous arrangement until at the reflective layer's exposed surface 86 (which has been covered by embedding resin 90 in FIG. 3), the aluminum atoms are predominantly amorphous in arrangement. In the amorphous region, there is an absence of grain structures and the surface 86 appears to have a rough surface texture. When the molding polymer is applied to the reflective layer 84, it first contacts the amorphous side of the reflective layer and the predominantly crystalline side becomes exposed to the atmosphere, unless it is covered by a protective coating (not shown).

Depending on the reflective material used, a protective layer can be used to suppress the effects corrosion may have on the reflective layer. As shown in FIG. 2, the reflective layer 14 is coated with a protective layer 15. In general, corrosion is the destructive attack of a metal by chemical or electrochemical reactions with its environment.

The protective layer functions mainly to protect the reflective layer from adverse effects of the environment. Such adverse effects may reduce the reflective layer's ability to redirect incident light. Such adverse effects include, for example, corrosion of the reflective layer, dirt accumulation on the reflective layer, or attack of the reflective layer causing it to chip, flake, and crack.

When an aluminum reflective layer is exposed to air, a layer of aluminum oxide, $Al_2O_3$, typically forms. The oxide bonds strongly to the aluminum layer and protects it from further oxidation. A thin layer of aluminum oxide is light transmissible, allowing a portion of the incident light to strike the underlying aluminum reflective layer. The oxide layer is estimated to be about 2 to 10 nanometers thick. One skilled in the art can reasonably expect that the inventive article having an aluminum reflector layer coated in the cube-comer shaped cavities will be stable in air. There is concern that because the aluminum reflector layer is typically thin, that is, on the order of about 500–1500 nanometers, that with time the aluminum oxide layer can consume the aluminum. If so, the aluminum could be depleted resulting in an article with substantially no reflector. In such a case and in other situations, a light transmissible protective layer can be used to protect the aluminum reflective layer.

The aluminum reflective layer also may need protection if it is exposed to water. Although aluminum is generally stable in distilled water, it tends to pit in waters containing chloride ions, $Cl^-$, particularly at crevices, such as in the valleys of a structured surface. Aluminum corrodes more rapidly in both acidic and basic solutions compared to distilled water. Thus, if the inventive article has an exposed aluminum reflective layer and the article is exposed to basic laundry detergents at elevated temperatures, supplied for example by warm water, the aluminum reflective layer may likely corrode.

The different mechanisms of providing a protective layer include using a protective polymeric film to cover the cube-corner cavities, using a corrosion resistant coating on the cube-corner elements or cavities, or filling the cavities with a polymer. There are several known methods to protect aluminum reflective layers. For example, plasma polymerization has been use to form organosilicone thin films for protecting aluminum reflector films for the automotive headlight industry. The films are also used as clear protective top coats on optical reflective films. See Thin Films, Vol. 23, Kirk-Othmer Encyclopedia of Chemical Technology, $4^{th}$ Ed. (1997), starting at page 1066. In general, plasma polymerization is a process of forming thin polymer films using plasma, a partially ionized gas. In one method, plasma polymerization is carried out using an electric glow discharge in a vacuum. Plasma polymerization forms thin polymeric films that, in most cases, are highly branched and highly crosslinked from low molecular weight materials that are soluble in solvents. See H. Yasuda, Plasma Polymerization, Academic Press, New York, page 1–5 (1985).

Another method of protecting the reflective layer involves forming a layer of light transmissible acrylic over the aluminum reflective layer. For example, a solution of acrylic resin can be sprayed over the second structured surface of the inventive article. The Henkel Corp. located in Ambler, PA, USA has a commercially available acrylate coating that is clear, i.e., light transmissible. The formulation is described in Henkel's January 1997 Data Sheet entitled "Formulation Guide E—Ultraviolet Metal Coatings and Inks." If desired, the protective layer can include a light transmissible colorant to impart a desired color to the inventive article.

When a silver reflective layer is exposed to air, it is susceptible to corrosion, such as tarnishing, caused by the formation of sulfur compounds such as silver sulfides, $Ag_2S$. These compounds have a yellowish to tan appearance affecting adversely the reflectivity performance of the silver reflective layer. Silver can also be oxidized to form layers of silver oxides. A layer of silver oxide usually does not bond strongly to the underlying silver reflective layer. The silver oxide tends to crack and fall off exposing fresh silver surface for further oxidation. As the oxidation process progresses, the silver reflective layer can be consumed.

Silver reflective layers have some advantages over aluminum. For example, silver is more reflective than aluminum, reflecting approximately at 98% of the incident light compared to 91% for aluminum. Silver also has a whiter appearance, which is usually a desirable feature because true colors can be achieved. In general, an article using an aluminum reflective layer has a gray appearance due to the color of the aluminum. Some investigators wanting the advantages of a silver reflective layer have found ways to protect the silver reflective layer.

U.S. Pat. No. 4,645,714 to Roche et al. discloses useful mercaptans to protect silver mirrors. Mercaptans belong to a group of organosulfur compounds and have the general structure, RSH, where R is any radical, such as, e.g., a benzene ring or an alkane. Roche teaches an embodiment comprising (1) a co-extruded biaxially oriented polyester film, (2) an opaque silver reflecting layer vapor deposited over the polyester film, (3) a coated layer of stable mercaptan, and (4) a protective polymer layer containing ultraviolet light absorbers overlying the mercaptan layer. Roche defined "stable mercaptan" to mean those in which the alpha carbon atom (the one bearing the sulfur) is otherwise attached only to carbon and hydrogen atoms and should have one or more polarizable groups at or near the end of the molecule to enhance compatibility with the polymer used in his protective layer. The mercaptans listed protect silver from corrosion and also act as an adhesion promoter, coupling agent, or primer for Roche's protective layer. Mercaptans generally have a slight yellowish hue. When coated in a monolayer, however, the mercaptan is substantially light transmissible and thus does not interfere with the silver layer's ability to retroreflect incident light.

Illustrative mercaptans suitable for the invention, as listed in U.S. Pat. No. 4,645,714, include mercaptoacetic acid, 3-mercaptopropionic acid, 11-mercaptoundecylic acid, thiophenol, diphenyl disulfide, N-(2-hydroxyethyl) mercaptoacetamide, 2,2'-dimercaptodiethyl ether, 2,2'-dimercapto diethyl thioether, 1,2-ethanedithiol, 3-mercaptopropyl trimethoxysilane, glycol bis(3-mercaptopropionate), trimethylolproprane tris(3-mercaptopropionate), and glycol dimercaptoacetate. About 0.5 to 2.5 weight percent of the mercaptan is dispersed in an acrylate or methacrylate interpolymer, which is described below. The weight percent is based on the total weight of the acrylates. Added to the mercaptan and the acrylate interpolymer is a carrier, typically a solvent. The solution can be spray coated on to inventive article's structured surface and then heated to evaporate the solvent.

The interpolymer Roche uses comprises or consists essentially of (1) about 50–70% monomers selected from the class consisting of methyl methacrylate and ethyl methacrylate and (2) correspondingly about 30–50% monomers selected from the class consisting of butyl acrylate, butyl methacrylate, and 2-ethylhexyl acrylate, the interpolymer dispersed in a 45% toluene solution.

Silver is known to be transmissible in the ultraviolet (UV) light range of about 300 to 400 nanometers wavelength. Such light can pass through the silver film and affect the underlying molding polymer. Consequently, a light transmissible layer has been used which contains additives to absorb UV light in the 300 to 400 nanometers range. UV absorbers such as benzotriaole, in about 5 weight percent of the acrylate, can be added to the interpolymer described above. Typically, the acrylic layer containing the UV absorbers is coated on top of the layer containing the mercaptan. U.S. Pat. No. 4,645,714 discloses several examples of benzotriazole commercially available from the Ciba-Geigy Corporation, Hawthorne, N.Y., USA under trade names TINUVIN™ 234 and TINUVIN™ 328.

When the reflective layer is gold, a suitable protective layer is a light transmissible polyurethane. Regardless of the type of reflective layer (i.e., whether dielectric or metallic, and in the latter case, whether aluminum, gold, or silver), a light transmissible polymeric film can be used to cover the cube-corner shaped cavities. The film can include additives such as colorants and ultraviolet light stabilizers, as long as the additives preferably allow a portion of the incident light to transmit into and be reflected by the inventive article. For certain applications, the polymeric films are preferably flexible in nature and may include polyvinyl chloride and polyurethane having an elastic modulus of less than about 7×108 pascals. If used, the polymeric film is preferably about 0.0005 to 0.015 inch (0.013 to 0.38 millimeter) in thickness.

Yet another method of protecting the reflective layer is to fill the entire cube-corner cavity with a filling polymer, which is a light transmissible polymer. Any light transmissible polymer capable of being extruded or coated into the cavities of the inventive article can be used.

Method of Making

Figure 4:
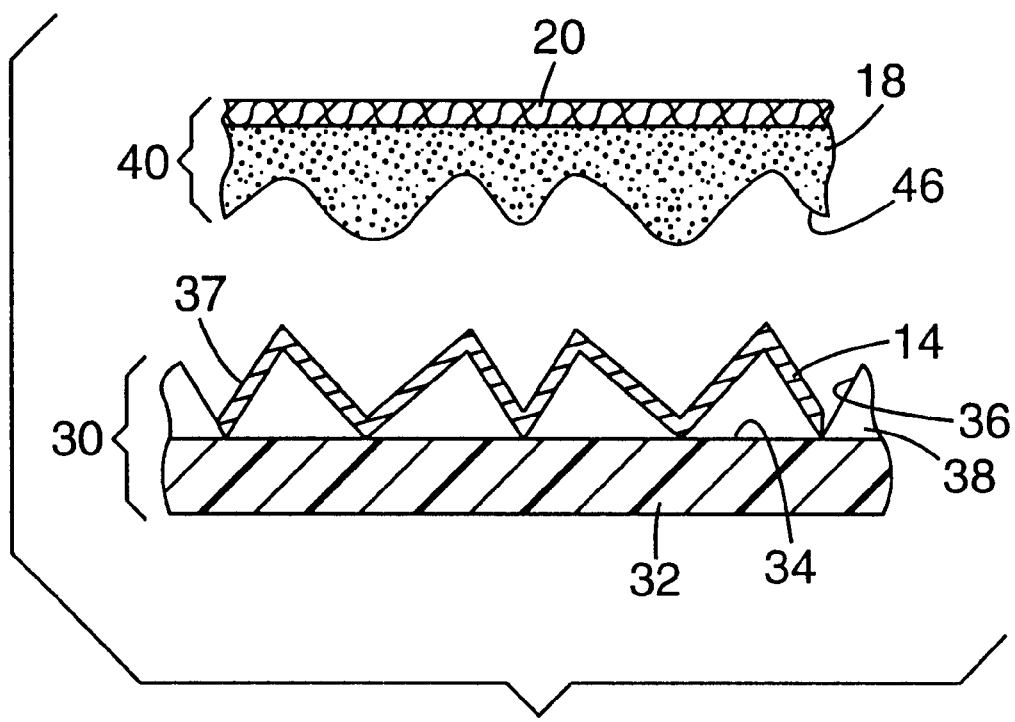
FIGS. 4 and 5 are cross-sectional views depicting the method of the present invention.

FIG. 4 shows an illustrative method of the invention where a tool 30 has a first structured surface 36 formed from a plurality of cube-corner elements 38 that project outwardly from a major surface 34 of a support layer 32. The tool 30 may be flexible or rigid. The elements 38 and the support layer 32 can be made from the same or from dissimilar materials. In the case of a flexible tool, a liner (not shown) may be used next to the support layer 32 to impart stability to the tool during processing. Typically, the flexible tool has dissimilar materials for the elements 38 and the layer 32. For example, the elements 38 can be one type of polymer, typically a rigid polymer, while the layer 32 can be of another type of polymer, typically a more flexible polymer than the elements 38. In the case of a rigid tool, for example, a metal tool, the layer 32 and elements 38 are typically made of a similar material. FIG. 1 shows a top view of an array 10 that may be useful as a tool for the practice of this invention.

A reflective layer 14 is coated on the structured surface 36. Reflective layer 14 has an exposed surface 37. The reflective layer can be made by vapor depositing aluminum, gold, silver, tin, et cetera using vacuum deposition or vacuum evaporation. The layer 14 is preferably of uniform thickness at different locations on the structured surface 36. When vapor deposition is used, the elements 38 preferably are made from a material that can withstand exposure to the high temperature, high vacuum conditions that are used in a typical vacuum deposition process. Temperature stable materials may include, for example, polycarbonate and acrylate.

A composite layer 40 comprises a molding polymer 18 optionally pre-attached to a carrier web 20, such as a fabric. The molding polymer can have a surface 46 that is initially substantially flat. Attachment to the carrier can be accomplished by conventional laminating techniques. One such technique uses two rollers positioned sufficiently close to one another so as to create a nip between them. The carrier web 20 is allowed to contact one roller. The molding polymer, typically on a liner, is allowed to contact a second roller, usually with the liner in direct contact with the second roller. Using pressure and heat, if necessary, the molding polymer 18 and carrier web 20 are intimately juxtaposed against each other. The molding polymer 18 can also be applied directly to the carrier web 20 by using known extrusion or coating techniques. The composite 40 is then applied to the tool 30 such that the molding polymer's exposed surface 46 contacts the reflective layer's exposed surface 37. Various methods of combining the composite 40 and the tool 30 are discussed in detail below.

The molding polymer 18 functions to replicate, that is, take on the shape of the structured surface 36, and to transfer the reflective layer from the tool to the molding polymer, which eventually becomes a part of the retroreflective article. Preferably, the replication of structured surface 36 is as precise as possible capturing essentially all the features of the structured surface 36. The replication step can be accomplished by applying the composite 40 to the tool 30 using several different methods.

In one method, the composite 40 is laminated to the tool 30. The lamination step typically uses heat and pressure. As shown in FIG. 4, the composite layer 40 is placed so that the molding polymer 18 faces the tool 30. For batchwise production, the composite and the tool are typically sandwiched between several skin layers, such as polyester and/or thick aluminum plates (not shown) and placed in a heated press. Using sufficient heat and pressure, the molding polymer 18 is intimately juxtaposed against the tool 30 to replicate the shape of the structured surface 36. Typically, the composite 40 is allowed to cool before it is removed from the tool 30.

Figure 5:
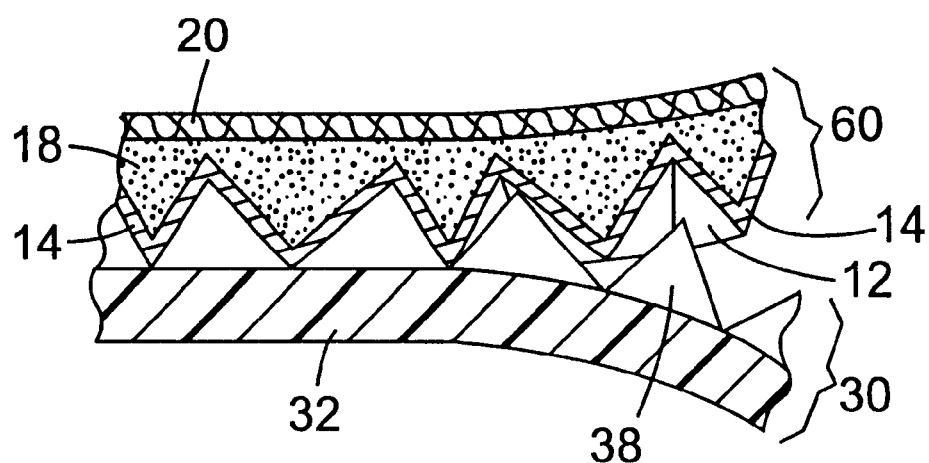

FIG. 5 shows that after the replication process, the tool 30 is separated from the article 60. During the separation step, the reflective layer 14 transfers from its initial position (on the first structured surface 36) to the second structured surface 46 of the molding polymer. Preferably, there is a clean transfer of the reflective layer 14 from the tool to the inventive article. A "clean transfer" of the reflective layer means that substantially all of it has moved from the initial position (on the tool) to the final position (on the retroreflective article). A clean transfer of the reflective layer is desirable as it insures that the structured surface of the inventive article is capable of retroreflecting incident light as efficiently as possible. In a continuous process, the lamination step integrates the replication step and the reflective layer transfer step by using a combination of hot cans and pressure rolls to supply the heat and pressure, much like the process described above for laminating the molding polymer 18 to the carrier 20.

The retroreflective article 60, after being removed from the tool 30, has an exposed reflective surface 14. A protective layer (not shown) can be applied to such a surface to minimize corrosion of the metal layer. The protective layer is preferably about 0.1 to 10 micrometer thick. In an alternative method, the protective layer can be applied to the structured surface 36 before applying the reflective layer 14. In this case, the protective layer most likely follows the topography of the surface 36. The protective layer is deliberately chosen to have better adhesion to the reflective layer than to the structured surface 36. During transfer of the reflective layer 14, the protective layer transfers with the reflective layer to the retroreflective article causing the protective layer to be exposed to ambient conditions. An illustrative protective layer is a thin light transmissible layer of titanium on a tool having a first structured surface made from an acrylate. A useful molding polymer is EAA.

In another embodiment of the inventive method of making a retroreflective article, the method comprises: (a) providing a device comprising a first structured surface; (b) applying a protective layer on the first structured surface such that a first adhesion value is established between the protective layer and the first structured surface, the protective layer having an exposed surface; (c) applying a reflective layer on the exposed surface of the protective layer such that a second adhesion value is established between the protective layer and the reflective layer; (d) applying a molding polymer to the exposed surface of the reflective layer such that a third adhesion value is established between the reflective layer and the molding polymer, the second and third adhesion values being higher than the first adhesion value; and (e) separating the device from the molding polymer to yield the retroreflective article having a second structured surface, the separation causing a transfer of the protective and reflective layers from the first structured surface to the retroreflective article.

If desired, a tie layer (not shown) can be applied to the exposed surface of the reflective material 14. The tie layer can be selected so as to be compatible with the molding polymer 18 and the reflective layer 14. For example, a polyurethane tie layer having good adhesion to an aluminum reflective layer could provide increased adhesion to the entire article when a polyurethane molding polymer is used.

Although the inventive methods described thus far use a tool having a plurality of cube-corner elements, the inventive method can be practiced with a mold that has a plurality of cube-corner shaped cavities. Thus, the molding polymer can be in liquid form and coated onto a mold. Using various coating techniques, the polymer is encouraged to cure by various known methods, such as drying or radiation curing.

In one coating method, the polymer is coated by screen printing, which allows the polymer to contact selective regions of the mold, typically by pouring or notch bar coating a quantity of the molding polymer through a screen mesh having a specific graphic design to create an image or text. The screen mesh-size controls the amount of polymer that contacts the mold. The amount of molding polymer used should be sufficient to cover the mold to replicate the entire first structured surface. Preferably, excess molding polymer is used so as to create a region joining the molding polymer together. Typically a carrier web, such as a fabric, is laminated to the side of the molding polymer not in contact with the mold. In this way, retroreflective graphic images can be made.

In another embodiment of the inventive method, the liquid molding polymer is coated to a mold as disclosed in U.S. Pat. No. 5,691,846 to Benson Jr., et al. A method of making a retroreflective article comprises the steps of: (a) providing a mold having a plurality of cube-corner cavities defining a first structured surface; (b) applying a reflective layer on the first structured surface such that a first adhesion value is established between the reflective layer and the first structured surface, the reflective layer having an exposed surface; (c) applying a volume of a molding polymer to the first structured surface such that a second adhesion value is established between the reflective layer and molding polymer, the second adhesion value being higher than the first adhesion value; (d) contacting a carrier web to the molding polymer; (e) minimizing excess molding polymer extending above the first structured surface; then (f) curing the molding polymer while in contact with the carrier web; and (g) separating the mold from the cured molding polymer to yield the retroreflective article having a second structured surface, the separation causing a transfer of the reflective layer from the mold to the retroreflective article. As a result of this process, the inventive article contains a second structured surface that bears a plurality of cube-corner elements coated with a reflective layer. The resin can be cured using actinic radiation, such as, e.g., electron beam, ultraviolet light (UV), or visible light. When UV or visible light is used, the carrier web is transparent to the respective light source so as to allow a portion of the light through to cure the molding polymer.

Other processing considerations can also to be taken into account. For example, before removing the tool or mold, the molding polymer is allowed to cool sufficiently to give structural integrity to the second structured surface. Typically, the entire composite (that is, the tool or mold, reflective layer, molding polymer, and carrier) is allowed to cool. Removing the tool or mold before the molding polymer cools sufficiently can yield cube-corner structures that are formed imprecisely. This lack of precision can reduce retroreflective efficiency of the inventive article.

In another embodiment of the inventive method, the molding polymer 18 may be a polymer melt exiting an extruder die. Conventional extrusion coating processes can be used. The polymer melt contacts the reflective coated tool 30 thereby replicating the first structured surface 36. Additional heat and pressure can be used, if needed, during extrusion to further aid precise replication of the structured surface 36. If desired, a carrier 20 can be laminated to exposed surface of the molding polymer, that is, the surface not in contact with the mold. The molding polymer is removed from the tool or mold so as to allow a clean transfer of the reflective layer.

EXAMPLES

The following examples are provided to illustrate different embodiments and details of the invention. Although the examples serve this purpose, the particular ingredients and amounts used, as well as other conditions and details, are not to be construed in a manner that would unduly limit the scope of the invention. Unless specified otherwise, all percentages are weight percentages.

Brightness Measurements

Measurements of the coefficient of retroreflection (brightness measurements), RA, were taken of the samples below using standard photometric equipment and techniques as generally described in ASTM E 808–94. The actual test method used to obtain RA values reported in the Examples are traceable back to ASTM E 808–94. The observation angle was set at 0.2 degree, the entrance angle was set at −4 degree, and the rotation angle of the sample was set at 0 degree, all of the angles being defined as in the test method.

Example 1

A reflective sheeting, commercially available from Minnesota Mining and Manufacturing (3M), St. Paul, Minn., USA as 3M™ Scotchlite™ High Gloss Reflective Film Unsealed 6160 (referred to as "High Gloss tool"), was used as a flexible, cubecomer tool. The tool had cube-corner elements (prisms) having a depth of about 0.0034 inch (0.086 mm). The cube-corner elements are formed as matched pairs. The optical axis of each element was canted or tilted about 4.31 degrees away from the primary groove, as generally illustrated in U.S. Pat. No. 5,138,488 to Szczech.

On the structured surface where cube-corner elements' faces are present, a layer of aluminum about 800 to 850 nanometers thick was vapor deposited. The aluminum reflective layer is deposited using an electron beam vacuum coater pulling a vacuum at about $6 \times 10^{-6}$ torr and an evaporation rate of about 18 to 24 angstroms per second. The vacuum coater used was a CHA Industries Mark 50 model (available from CHA Industries, Freemont, Calif., USA).

A 0.003 inch thick (0.076 mm) ethylene methacrylic acid (EMAA) molding polymer film (available from DuPont Co., Willimington, Del., USA as Nucrel™ 699 adhesive) was laminated to a polyester blend fabric available as Excellerate™ (a 65%–35% polyester-cotton blend available from Spring Industries, Rock Hill, S.C., USA) to yield a composite. The composite was placed on the High Gloss tool such that the EMAA film contacted the aluminum reflective layer. The entire construction was sandwiched between several layers of flat aluminum plates and 0.0024 inch (0.061 mm) polyester film. Using a Hix Model N-800 press (available from Hix Corporation, Pittsburg, Kans., USA) set to a temperature of about 250° F. (121° C.), a pressure of about 40 psi (275 kPa), and a dwell time of about 10 minutes, the composite was laminated to the High Gloss tool. After cooling, the High Gloss tool was separated from the molding polymer to yield a retroreflective article. The separation caused the reflective layer to transfer from the High Gloss tool to the molding polymer. The article had cube-corner shaped cavities with an aluminum reflective layer coated on the optical faces. The article had a brightness measurement of about 577 candelas/lux/meter$^2$.

Example 2

A retroreflective article was made according to Example 1 except that the molding polymer was a 0.002 inch (0.051 mm) linear co-polyester film (available as product number "5250" from Bemis Associates, Shirley, Mass., USA). The molding polymer was laminated to the aluminum coated High Gloss tool using the Hix press under substantially the same processing conditions as in Example 1. After the entire construction was cooled, a 100% polyester fabric (available from Milliken Co., Spartanburg, S.C., USA) was laminated to the flat, i.e., non-structured, side of the molding polymer. The resulting retroreflective article had plurality of cube-comer shaped cavities formed from the co-polyester film molding polymer, an aluminum reflective layer coated on the optical faces of the cavities, and a polyester fabric carrier supporting the molding polymer. The article had a brightness measurement of about 691 candelas/lux/meter$^2$.

Example 3

A retroreflective article was made according to Example 1 except that the molding polymer was a 0.010 inch thick (0.254 mm) semi-crystalline polyamide film. The film was made by extruding Vestamelt 450-P2 resin powder (available from Creanova Inc., Sommerset, N.J., USA) onto a 0.0024 inch (0.061 mm) polyester liner using standard extrusion coating methods. The molding polymer was laminated to the previously aluminum coated High Gloss tool using the Hix press under substantially the same processing conditions as in Example 1.

After the entire construction was cooled, the polyester liner was stripped off and a 100% polyester fabric (available from Milliken Co., Spartanburg, S.C., USA) was laminated to the flat, i.e., non-structured, side of the molding polymer. The resulting retroreflective article had plurality of cube-comer shaped cavities formed from the polyamide film molding polymer, an aluminum reflective layer coated on the optical faces of the cavities, and a polyester fabric carrier supporting the molding polymer. The article had a brightness measurement of about 622 candelas/lux/meter$^2$.

Example 4

A retroreflective article was made according to Example 1 except that the molding polymer was a 0.002 inch thick (0.051 mm) high melting polyester film. The film was made by extruding Dynapol S1359 resin (available from Creanova Inc., Sommerset, N.J., USA) onto a 0.0024 inch (0.061 mm) polyester liner using standard extrusion coating methods. The molding polymer was laminated to the aluminum coated High Gloss tool using the Hix press under substantially the same processing conditions as in Example 1.

After the entire construction was cooled, the polyester liner was stripped off and a 100% polyester fabric (available from Milliken Co., Spartanburg, S.C., USA) was laminated to the flat, i.e., non-structured, side of the molding polymer. The resulting retroreflective article had plurality of cube-corner shaped cavities formed from the high melting polyester film molding polymer, an aluminum reflective layer coated on the optical faces of the cavities, and a polyester fabric carrier supporting the molding polymer. The article had a brightness measurement of about 512 candelas/lux/meter$^2$.

Example 5

A retroreflective article was made according to Example 1 except that the molding polymer was a 0.002 inch thick (0.051 mm) polyurethane film (available as product number "3218" from Bemis Associates, Shirley, Mass., USA). The molding polymer was laminated to the aluminum coated High Gloss tool using the Hix press under substantially the same processing conditions as in Example 1.

After the entire construction was cooled, a 100% polyester fabric (available from Milliken Co., Spartanburg, S.C., USA) was laminated to the flat, i.e., non-structured, side of the molding polymer. The resulting retroreflective article had plurality of cube-comer shaped cavities formed form the polyurethane film molding polymer, an aluminum reflective layer coated on the optical faces of the cavities, and a polyester fabric carrier supporting the molding polymer. The article had a brightness measurement of about 48 candelas/lux/meter$^2$.

Example 6

A sample was made to determine the adhesion (using a 90° peel test) between an acrylate molding polymer film and an aluminum reflective layer. The sample was made as follows. On a clear, colorless PET based liner having a thickness of about 0.002 to 0.004 inch (0.05 to 0.10 mm), an acrylate solution was coated using conventional coating techniques, such as notch bar coating, to a dry thickness of about 0.0002 to 0.0005 inch (0.005–0.013 mm). The resin solution was made from the following formulation: 1,6 hexanediol diacrylate, trimethylolpropane triacrylate, and bisphenol A epoxy diacrylate, in a ratio of 25:50:25 parts by weight with 1% resin weight Darocurr™ 4265 as photoinitator (available from Ciba Geigy Corporation). The resin solution was cured through the PET liner with a FUSION H lamp (available from Fusion UV Curing Systems, Gaithersburg, Md., USA) operating at about 235 watt/cm at a line speed of 25 ft/min (7.6 m/min), and then postcured from the acrylate side with the FUSION H lamp at substantially similar processing conditions, as stated above. The resulting intermediate sample is a PET based liner having an acrylate molding polymer disposed on it, the acrylate layer molding polymer having a first side in direct contact with the PET based liner and a second side that is exposed.

On the exposed side of the acrylate, an aluminum reflective layer was deposited using an electron beam vacuum coater pulling a vacuum of about $6\times10^{-6}$ torr and an evaporation rate of about 18 to 24 angstroms per second. The aluminum reflective layer was about 800 to 1000 nm thick. The resulting sample is an aluminum coated acrylate composite disposed on a PET based liner.

The adhesion between the aluminum reflective layer and the acrylate molding polymer was tested. The acrylate composite made above was cut to 1 inch by 6 inch (2.54 cm by 15.2 cm) sample and then attached to a T-6061 aluminum panel that was previously heat laminated with an ethylene acrylic acid (EAA) adhesive layer that was about 2 inch by 6 inch (5.08 by 15.2 cm). The EAA layer was about 0.002 to 0.003 inch thick (0.05 to 0.08 mm). The sample was not completely attached to the EAA but instead, one end of the sample, about 1 inch long, was purposefully left unattached. The sample was attached such that the aluminum reflective layer was in direct contact with the EAA. The attached sample was conditioned at ambient conditions (generally about 70° F.) for about 24 hours before testing.

After conditioning, the attached sample was placed in a tensile testing machine known under the trade designation SINTECH (available from SINTECH, a division of MTS Systems, Eden Prairie, Minn., USA) and subjected to the 90° Peel Back test as follows. The entire construction (test panel and sample) was slipped into a test holder such that the panel was held down on several of the edges, but sample was exposed and lied parallel to the bottom of the SINTECH-1 unit. The unattached end of the sample was bent at 90° and clamped to the upper test grip of the SINTECH-1. The sample was pulled back in such a fashion it made a 90° angle with the test panel. The sample was pulled back at a constant head speed of about 12 inches/min (30 cm/min). Because the adhesion between the aluminum reflective layer and the EAA is much greater than the adhesion between the aluminum reflective layer and the acrylate molding polymer, the failure occurred between the aluminum and the acrylate. That is to say, as the sample is being pulled back, the aluminum stayed with the EAA. The peel strength was measured to be about 0.2 pounds per inch width, representing the adhesion value between the aluminum and the acrylate.

All references cited above, including patents discussed in the Background, are incorporated by reference in their entirety into this document.

The present invention may be suitably practiced in the absence of any element or item not specifically described in this document.

What is claimed is:

1. A method of making a retroreflective article, which method comprises:
   (a) providing a device comprising a first structured surface having a plurality of cube corner structures;
   (b) applying a reflective layer directly on the first structured surface such that a first adhesion value is established between the reflective layer and the first structured surface, the reflective layer having an exposed surface;
   (c) applying a molding polymer to the exposed surface of the reflective layer such that a second adhesion value is established between the reflective layer and the molding polymer, the second adhesion value being higher than the first adhesion value; and
   (d) separating the device from the molding polymer to yield the retroreflective article having a second structured surface, the separation causing a transfer of the reflective layer from the first structured surface to the retroreflective article.

2. The method of claim 1 wherein the device is a tool having a plurality of cube-corner elements defining the first structured surface.

3. The method of claim 1, wherein after step (c), the method further comprises the steps of:
   (a) contacting a carrier web to the molding polymer;
   (b) minimizing excess molding polymer extending above the first structured surface; and then
   (c) curing the molding polymer while in contact with the carrier web.

4. The method of claim 3, wherein the device is a mold having a plurality of cube-corner shaped cavities defining the first structured surface.

5. The method of claim 1, wherein the reflective layer is adhesively attached to the second structured surface.

6. The method of claim 1, wherein the reflective layer is selected from the group consisting of aluminum, silver, tin, and gold.

7. The method of claim 1, wherein after step (d), the method further comprises applying a light transmissible protective layer on the reflective layer disposed on the second structured surface of the retroreflective article.

8. The method of claim 7, wherein the protective layer further comprises a light transmissible colorant.

9. The method of claim 7, wherein said protective layer is selected from a group consisting of light transmissible mercaptan, organosilicone, acrylic, and polyurethane.

10. The method of claim 1, wherein after step (b), the method further comprises applying a tie layer on the exposed surface of the reflective layer.

11. The method of claim 1 wherein the molding polymer is selected from the group consisting of extrudable resin, actinic curable resin, and reaction curable resin.

12. The method of claim 1, wherein the molding polymer is a thermoplastic polymer selected from the group consisting of ethylene copolymers containing carboxyl groups or esters of carboxylic acids, polyethylene acrylate, polyesters, linear co-polyesters, polyurethanes, polyester amides, polyamides, and crystalline rubber based polymers.

13. The method of claim 1, wherein the molding polymer is thermoplastic polymer having a softening temperature less than about 450° F. as determined by ASTM E 28–97.

14. The method of claim 1, wherein the molding polymer is applied to the reflective layer using a method selected from the group consisting of laminating, extruding, screen printing, and coating.

15. The method of claim 1 further comprising supporting the molding polymer with a carrier selected from the group consisting of fabric and polymer film.

16. The method of claim 1, wherein the first structured surface is a polymer selected from the group consisting of polycarbonate and acrylate.

17. The method of claim 16, wherein the reflective layer is aluminum.

18. A method of making a retroreflective article, which method comprises:
   (a) providing a device comprising a first structured surface having a plurality of cube corner structures;
   (b) applying a protective layer directly on the first structured surface such that a first adhesion value is established between the protective layer and the first structured surface, the protective layer having an exposed surface;
   (c) applying a reflective layer on the exposed surface of the protective layer such that a second adhesion value is established between the protective layer and the reflective layer;
   (d) applying a molding polymer to the exposed surface of the reflective layer such that a third adhesion value is established between the reflective layer and the molding polymer, the second and third adhesion values being higher than the first adhesion value; and
   (e) separating the device from the molding polymer to yield the retroreflective article having a second structured surface, the separation causing a transfer of the protective and reflective layers from the first structured surface to the retroreflective article.

19. The method of claim 18, wherein the protective layer further comprises a light transmissible colorant.

* * * * *

UNITED STATES PATENT AND TRADEMARK OFFICE
CERTIFICATE OF CORRECTION

PATENT NO.     : 6,440,334 B2
DATED          : August 27, 2002
INVENTOR(S)    : Currens, Michael D.

It is certified that error appears in the above-identified patent and that said Letters Patent is hereby corrected as shown below:

Column 2,
Line 3, delete "cube-comer" and insert in place thereof -- cube-corner --.

Column 3,
Lines 19, 45, 48, 53, 56, 60, 66 and 67, delete "cube-comer" and insert in place thereof -- cube-corner --.

Column 4,
Lines 4, 16, 17, 19, 22, 27, 30, 31, 33, 36, 38, 40 and 67, delete "cube-comer" and insert in place thereof -- cube-corner --.

Column 5,
Lines 1, 3, 4, 9, 10, 17, 23, 24, 25, 30, 34, 36, 38, 39 and 40, delete "cube-comer" and insert in place thereof -- cube-corner --.

Column 8,
Line 46, delete "cube-comer" and insert in place thereof -- cube-corner --.

Column 9,
Lines 1 and 2, delete "cube-comer" and insert in place thereof -- cube-corner --.

Column 10,
Line 50, delete "cube-comer" and insert in place thereof -- cube-corner --.
Line 56, delete "7x108" and insert in place thereof -- $7x10^8$ --.

Column 14,
Line 10, delete "RA," and insert in place thereof -- $R_A$, --.
Lines 22, 24, 30 and 57, delete "cube-comer" and insert in place thereof -- cube-corner --.

Column 15,
Lines 6 and 29, delete "cube-comer" and insert in place thereof -- cube-corner --.

Column 16,
Line 3, delete "form" and insert in place thereof -- from --.
Line 3, delete "cube-comer" and insert in place thereof -- cube-corner --.
Line 51, delete "purposefully" and insert in place thereof -- purposely --.

Column 17,
Lines 22, 39 and 50, delete "cube-comer" and insert in place thereof -- cube-corner --.

UNITED STATES PATENT AND TRADEMARK OFFICE
CERTIFICATE OF CORRECTION

PATENT NO.    : 6,440,334 B2
DATED         : August 27, 2002
INVENTOR(S)   : Currens, Michael D.

It is certified that error appears in the above-identified patent and that said Letters Patent is hereby corrected as shown below:

Column 18,
Line 36, delete "cube-comer" and insert in place thereof -- cube-corner --.

Signed and Sealed this

First Day of April, 2003

JAMES E. ROGAN
*Director of the United States Patent and Trademark Office*